United States Patent [19]

Kurian et al.

[11] Patent Number: 5,925,300

[45] Date of Patent: Jul. 20, 1999

[54] PROCESS OF MAKING A SHAPED ARTICLE FROM NYLON POLYMER

[75] Inventors: Joseph V. Kurian; Ralph Walter Nugent, both of Seaford, Del.

[73] Assignee: E. I. du Pont de Nemours and Company, Wilmington, Del.

[21] Appl. No.: 08/811,889

[22] Filed: Mar. 5, 1997

Related U.S. Application Data

[62] Division of application No. 08/528,753, Sep. 15, 1995, Pat. No. 5,654,355, which is a continuation of application No. 08/171,788, Dec. 22, 1993, abandoned.

[51] Int. Cl.⁶ .............................. B29C 45/00; D01F 1/10; D01F 6/60; D01F 6/80
[52] U.S. Cl. ................ 264/211; 264/328.17; 264/331.19
[58] Field of Search .............................. 264/211, 328.17, 264/331.19

[56] References Cited

U.S. PATENT DOCUMENTS

| | | | |
|---|---|---|---|
| 3,529,929 | 9/1970 | Page et al. | 423/490 |
| 3,574,047 | 4/1971 | Ando et al. | 428/374 |
| 3,755,221 | 8/1973 | Hitch | 524/227 |
| 3,772,872 | 11/1973 | Piazza et al. | 57/243 |
| 4,176,227 | 11/1979 | Baggett et al. | 528/488 |
| 4,521,484 | 6/1985 | Li | 428/374 |
| 4,919,874 | 4/1990 | Windley | 264/168 |
| 5,156,797 | 10/1992 | Yamasaki et al. | 264/518 |
| 5,194,620 | 3/1993 | Roling et al. | 548/112 |
| 5,219,503 | 6/1993 | Boles, Jr. et al. | 264/103 |
| 5,321,068 | 6/1994 | De Witt, Jr. | 524/321 |

FOREIGN PATENT DOCUMENTS

| | | |
|---|---|---|
| 48-28975 | 9/1973 | Japan . |
| 51-60726 | 5/1976 | Japan . |
| 51-86555 | 7/1976 | Japan . |
| 52-21417 | 2/1977 | Japan . |
| WO 88/02703 | 4/1988 | WIPO . |

OTHER PUBLICATIONS

Patent Abstracts of Japan, vol. 13, No. 326 (C–620) Jul. 24, 1989, Kitamura Kazuyuki, *Production of Polyamide*, JP1104654.

*Primary Examiner*—Leo B. Tentoni

[57] ABSTRACT

A process for making shaped articles from nylon polymer by melting the polymer and forming the molten polymer into articles is improved by adding to the polymer at least about 5 ppm of an additive compound selected from the group consisting of magnesium, calcium and zinc salts of aliphatic dicarboxylic acids having 2 to 14 carbon atoms.

11 Claims, 5 Drawing Sheets

PROCESS OF MAKING A SHAPED ARTICLE FROM NYLON POLYMER

This is a division of application Ser. No. 08/528,753, filed Sep. 15, 1995, now U.S. Pat. No. 5,654,355, which is a continuation of application Ser. No. 08/171,788, filed Dec. 22, 1993, now abandoned.

BACKGROUND OF THE INVENTION

The present invention relates to nylon polymer useful for the manufacture of shaped articles such as fibers and injection molded articles and more particularly relates to nylon containing nucleation additives.

A common problem in the melt-spinning of highly crystalline nylon homopolymers such as poly(hexamethylene adipamide) has been the formation of spherulites in the polymer of the resulting fiber. Spherulites are spherical crystalline bodies of radiating crystals found in the polymer which typically form due to inorganic and degradation-related impurities. When large spherulites form in substantial numbers, they lower the strength or form defects in the fiber, either of which can cause the fiber to break in the spinning process or in end-use processing. Spherulites in the yarn are often responsible for defects or poor uniformity in the finished good made from the yarn which adversely affect the properties of the goods for their intended end use. Nylon carpet yarns containing pigments or other polymers such as polyolefins which are immiscible in the nylon are particularly prone to problems caused by spherulites.

Copolymer nylons crystallize less readily than homopolymer nylons and consequently are not as prone to the formation of spherulites. However, some of these yarns have a reduced levels of fiber finish pick-up which causes filament instability in the spinning process due to varying frictional forces experienced by the yarn on process equipment. This may result in a yarn with decreased uniformity which may in turn cause poor dye uniformity in fabric made from the yarn.

In the manufacture of molded articles by injection molding, one rate-controlling step in the process is the time which the mold is closed until the polyamide is sufficiently solidified to be removed from the mold without damage. It is desirable, therefore, to have a polyamide which crystallizes and solidifies quickly while, at the same time, preserves polymer clarity for applications where polymer clarity is desired.

Agents are known for addition to nylon polymer to affect the nucleation of the polyamide, i.e., the process by which crystallization takes place in the molten polymer. For example, as disclosed in U.S. Pat. Nos. 3,755,221, 3,529,929 and 4,176,227, particles of $CaF_2$ are either added to or formed in the molten nylon polymer in situ to improve cycle times for injection molding or enable the use of higher spinning temperatures and higher extrusion rates in the melt-spinning of nylon fiber. However, such particulates are often ineffective and, when $CaF_2$ is used, the fluoride ion in the reactants used to make $CaF_2$ or fluoride ion in the molten polymer can cause corrosion of processing equipment. The particles of $CaF_2$ also make the molded article or fiber have a cloudy appearance which is undesirable for some end uses.

Calcium acetate has also been added to a nylon 6,6/nylon 6 copolymer to reduce spherulites while maintaining clarity in the fiber as disclosed in U.S. Pat. No. 4,919,874. However, the presence of calcium acetate in the polymer substantially decreases the relative viscosity (RV) of the nylon polymer. Consequently, calcium acetate as a nucleating agent is generally undesirable and is entirely unsuitable for some processes for which high RV nylon polymer is required.

SUMMARY OF THE INVENTION

It has been discovered that adding certain water-soluble additive compounds to nylon polymer provides significant advantages in melt-spinning and injection molding processes. The invention thus provides a nylon polymer composition and a process for making shaped articles from the composition by melting the polymer and forming the molten polymer into an article. The water-soluble additive compound for the composition is selected from the group consisting of magnesium, calcium and zinc salts of aliphatic dicarboxylic acids having 2 to 14 carbon atoms and mixtures thereof. The compound is added in sufficient quantity to provide at least about 5 ppm of the compound in the polymer based on the weight of the magnesium, calcium and zinc. In accordance with the composition and process of the invention, the nylon polymer is also substantially free of fluoride. The invention is preferably employed with polyadipamide polymers.

DETAILED DESCRIPTION

Figure 1:
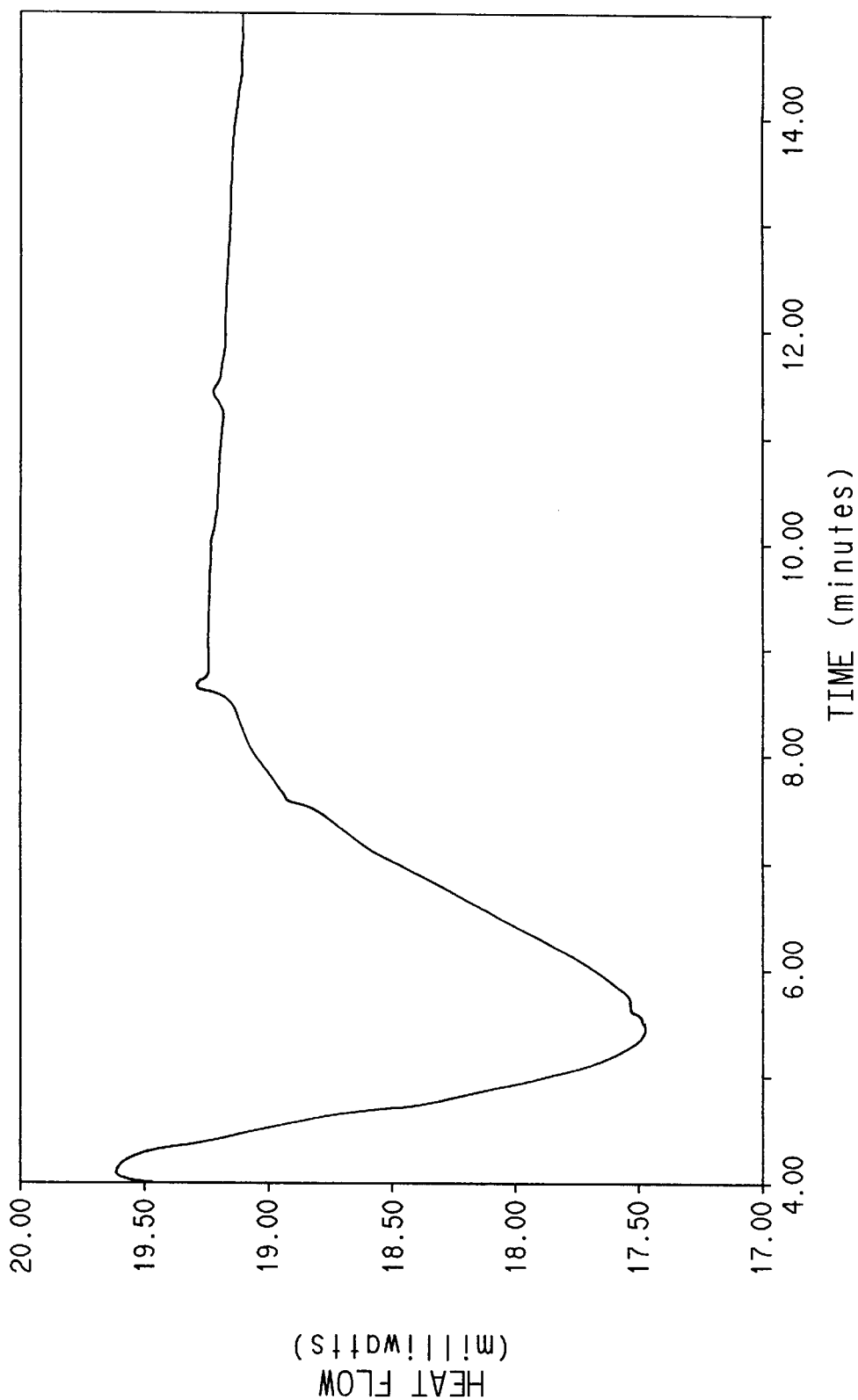
FIG. 1 is a graphical representation of a differential scanning calorimeter (DSC) trace of heat flow against time for a conventional nylon 6,6 polymer composition as in Example 4, Item 1, showing the crystallization exotherm.

Nylon polymer is used in this application to refer to polyamide homopolymers and copolymers which are predominantly aliphatic, i.e., less than 85% of the amide-linkages of the polymer are attached to two aromatic rings. Widely-used nylon polymers such as poly(hexamethylene adipamide) [nylon 66] and poly(e-caproamide) [nylon 6] and their copolymers can be used in accordance with the invention. Other nylon polymers which may be advantageously used are nylon 12, nylon 6,10 and nylon 6,12.

Polyadipamide refers in this application to nylon polymer in which at least about 60 mole percent of the amide units of the polyamide are adipamide units, i.e., are formed from adipic acid. While it will be understood that essentially equivalent molar quantities of a diamine must be present in the polymer since adipic acid is a diacid, the term adipamide units is intended to include amide units formed not only from adipic acid with diamines but also with lactams such as caprolactam. Other amide forming species are also possible although usually in very minor amounts. For example, triamines such as 4-aminomethyl-1,8-diaminooctane which act as chain-branchers may be incorporated at very low levels.

Preferred homopolymer polyadipamides are hexamethylene adipamide (66 nylon) and tetramethylene adipamide (46 nylon). Homopolymer poly(hexamethylene adipamide) (66 nylon) is particularly preferred for the practice of the present invention.

Preferred polyadipamide copolymers are those which comprise at least about 60 mole percent hexamethylene adipamide units. The invention is particularly useful for such preferred polyamides which contain at least about 0.2 mole % 2-methylpentamethylene adipamide units. Furthermore, other diamine/adipic acid copolymer systems containing at least about 60 mole percent hexamethylene adipamide units may contain 2-ethyltetramethylene adipamide units, pentamethylene adipamide units, trimethylhexamethylene adipamide units and 1,4-cyclohexyl adipamide units. Copolyamides in accordance with the invention may contain as minority components hexamethylene terephthalamide units, hexamethylene isophthalamide units, hexamethylene 5-sulfo-isophthalamide units, hexamethylene dodecanediamide units, and $\epsilon$-caproamide units.

The nylon polymer preferably has a relative viscosity (RV) when used for fiber manufacture of between about 35 and about 100. For injection molding applications the RV typically falls within the same range but may be lower or higher depending upon the desired end use properties.

The additive compound is a magnesium, calcium or zinc salt of aliphatic dicarboxylic acids having 2 to 14 carbon atoms and can be a mixture of such compounds. The additive compounds include, for example, magnesium, calcium and zinc adipates, glutarates, succinates, or oxalates. Magnesium, calcium and zinc adipates are particularly effective in providing nucleation and are the preferred additive compounds. Since it is very effective when employed in small quantities, the most preferred compound is magnesium adipate.

The additive is added to the polymer as the salt itself or is formed in situ using appropriate reactants. The words "added" or "addition" are intended in this application to encompass either the addition of the salt itself to the polymer or the in situ formation of the compound in the polymer. When the nylon polymer is made by polymerization of polyamide monomers from an aqueous solution, it is preferred for the additive to be incorporated into the polymer by addition to such aqueous solution since this assists with the thorough distribution of the compound in the polymer. Preferably, the additive compound is added to the aqueous solution as the salt. However, another suitable procedure for adding either magnesium, calcium, or zinc adipate to a polyadipamide polymer is to provide a stoichiometric excess of adipic acid over the amount of diamine present which is equivalent to the desired level of magnesium, calcium or zinc adipate desired. A suitable compound such as $Ca(OH)_2$, $CaCO_3$, $Mg(OH)_2$, $MgCO_3$, $Zn(OH)_2$ or $ZnCO_3$ providing a source for the magnesium, calcium or zinc ion can then be added to provide the additive.

It is also possible to add the compound to the fully formed polymer, preferably by direct addition of the salt, but it is also possible to employ in situ formation. In either case, appropriate measures must be taken to insure that proper mixing takes place in the polymer.

A masterbatch containing a low molecular weight carrier polymer and a high concentration of the additive can be melt blended with a main polymer source to practice the invention. Similarly, an aqueous solution of the additive can also be used as a vehicle for incorporating the additive into a polymer undergoing melting provided that appropriate mixing conditions are used followed by suitable dewatering and polymer drying steps.

The amount of the additive compound is at least about 5 ppm based on the weight of the metal ion of the compound. Preferably, the compound is present in the range of about 5 to about 1000 ppm by weight, most preferably, 10 to about 150 ppm. Typical amounts for many fiber spinning processes when magnesium, calcium or zinc adipate is used are 15 to 100 ppm. Amounts in the lower end of this most preferred range with magnesium adipate are typically satisfactory due to its high effectiveness. Amounts in the middle to higher end of the range are typically used for calcium and zinc adipate.

The nylon polymer employed in accordance with the invention is substantially free of fluoride. Substantially free of fluoride means that the polymer has a sufficiently low quantity of fluoride so that the fluoride does not react to form particles with the calcium, magnesium, or zinc in the polymer. Since the solubilities of calcium, magnesium, and zinc fluorides vary, the term substantially free of fluoride varies with the cation present. Preferably, however, the fluoride ion content is less than 3 parts per million (ppm) by weight. Although the polymer can include other types of particulate additives such as delusterants, pigments, etc., it is advantageous in a process in accordance with the invention for the polymer to be substantially free of compounds which form particulates by reaction with the additive compound. Otherwise, the effectiveness of the additive compound can be decreased.

In a process in accordance with the invention, it is preferable for the polymer to be substantially free of monocarboxylic acids and their salts. It is observed that monocarboxylic acids and their salts in nylon polymer can cause a substantial reduction in the RV of the polymer. Accordingly, the term substantially free of monocarboxylic acids and their salts means that the amount of monocarboxylic acids and their salts is sufficiently low that RV is not affected. Preferably, the amount of monocarboxylic acids or their salts is less than about 0.1 mole %.

The nylon polymer may also contain any of the known additives for incorporation into the polymer including catalysts, delusterants, antioxidants, pigments and the like provided that the additive does not adversely affect the process.

The invention is useful for a wide variety of known processes for forming shaped articles from nylon polymer including melt-spinning, film extrusion and injection molding processes. The invention can be advantageously used for coupled spin-draw processes which produce an as-spun yarn at low speed which is then drawn or otherwise processed in one or more subsequent draw steps. Typical of such processes are textile nylon spinning processes for fully-drawn yarns and for tows for staple production and bulkedcontinuous filament (BCF) yarns for use as carpet yarns. Industrial yarns for tire cord or airbag use are also made using this type of process. The invention is also useful for high speed spinning processes which produce as-spun yarns with higher orientation due to stress-induced crystallization which may or may not be drawn depending on the desired end use. Typical of such processes are textile nylon spinning processes for partially-oriented yarns for use as draw-texturing feed yarns or processes for making fully-drawn yarns for critical dye end uses.

Figure 4:
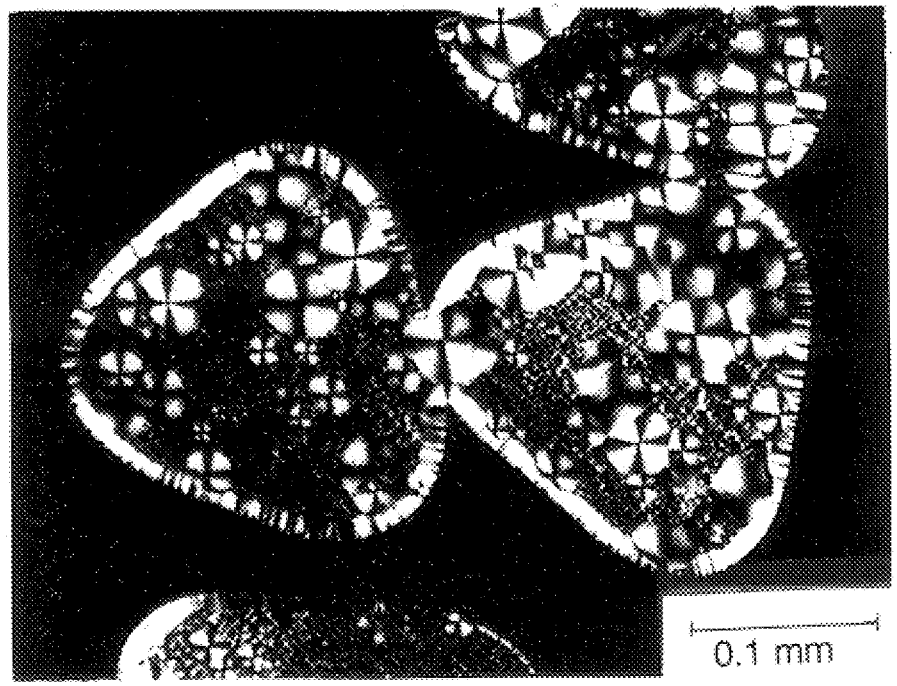
FIG. 4 is a cross-sectional photomicrograph using polarized light at 250X of a nylon 6,6 fiber made by allowing extruded polymer to freely fall under its own weight from a spinneret, i.e., under conditions which promote sperulitic growth.
Figure 5:
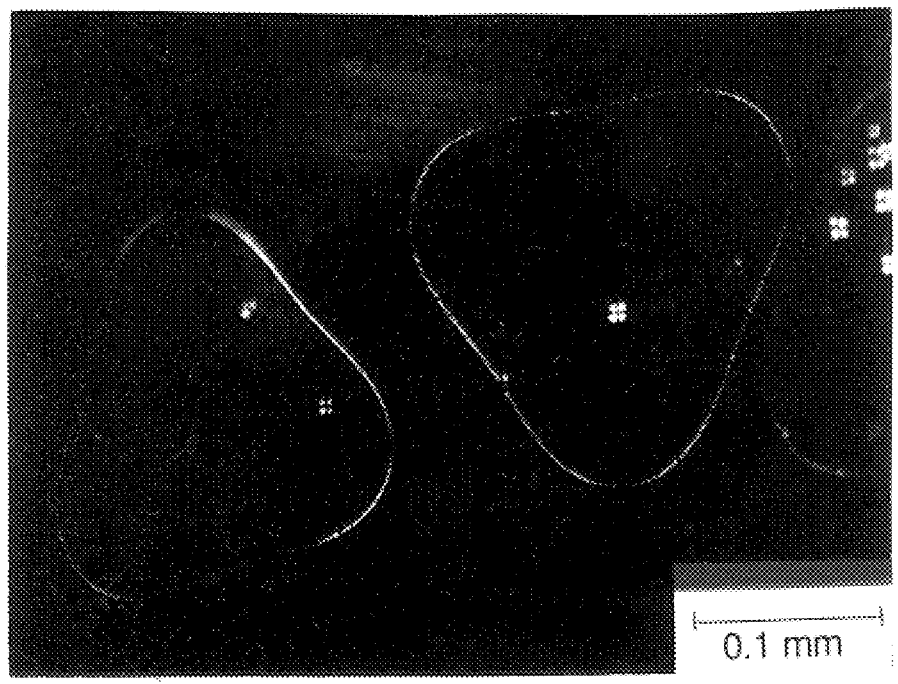
FIG. 5 is a cross-sectional photomicrograph of a nylon 6,6 fiber made as described for FIG. 4 but containing 20 ppm magnesium adipate (based on the weight of the magnesium)
Figure 6:
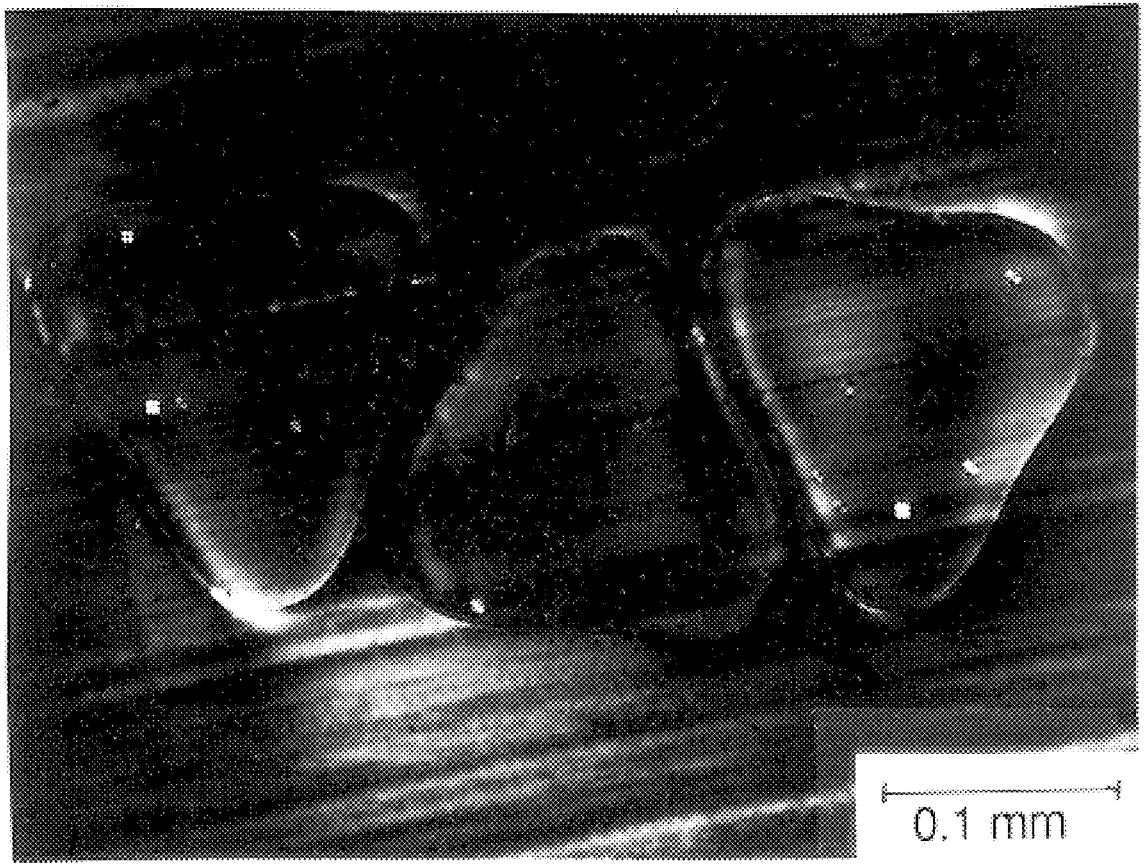
FIG. 6 is a cross-sectional photomicrograph of a yarn of 95 mole % poly(hexamethylene adipamide) and 5 mole % poly(2-methylpentamethylene adipamide) made as described for FIG. 4 but containing 30 ppm magnesium adipate (based on the weight of the magnesium).

In fibers of homopolymer nylons such as homopolymer poly(hexamethylene adipamide), the invention provides an increased level of crystallization over known spinning processes. The resulting polymer of the fiber has fewer visible spherulites with a small spherulite size which provide a more uniform structure therefore improving finish pickup and dye uniformity. This may be seen by comparing the micrographs of FIG. 5 (Invention) and FIG. 4 (Control). For copolymers such as poly(hexamethylene adipamide) containing at least about 0.2 mole percent 2-methylpentamethylene adipamide units, the rate of crystallization is increased so that the copolymer can be spun in a manner more like homopolymer nylon thereby enabling increased throughput in spinning. This may be seen in FIG. 3 by comparing curve C (Invention) with curve D (Control) and curve A (Homopolymer nylon 6,6 control). Finish pick-up problems are also reduced or eliminated.

For use as a molding resin, the invention also provides decreases in cycle time while maintaining clarity in the nylon composition.

For recycled nylon which has a polymer composition and/or possible contaminants which vary with time causing difficulties in end use, the invention provides a technique for inducing a more uniform crystal structure.

The advantages of the invention are achieved while avoiding the problems associated with fluoride, without loss in RV and while maintaining clarity in the polymer.

TEST METHODS

Relative Viscosity of the polyamide refers to the ratio of solution and solvent viscosities measured at 25° C. in a solution of 8.4% by weight polyamide polymer in a solvent of formic acid containing 10% by weight of water.

Tenacity and Break Elongation are measured as described by Li in U.S. Pat. No. 4,521,484 at column 2, line 61 to column 3, line 6. The number of measurements used for the calculation of sigma are indicated by "n=" in the tables which follow.

Boil-Off Shrinkage is measured according to the method in U.S. Pat. No. 3,772,872 column 3, line 49 to column 3 line 66. Boil-off Shrinkage Coefficient of variation is calculated using the number of measurements indicated by "n=".

C.I. Acid Blue 122 One-End Fabric Uniformity is determined using the same procedure as the Large Molecule Acid Dye Uniformity Method reported in U.S. Pat. No. 5,219,503 at column 19, line 34 to column 20, line 18.

Differential Scanning Calorimetry (DSC) The crystallization kinetics of nylon polymer can be measured using a differential scanning calorimeter (DSC). Isothermal crystallization tests performed by DSC give fundamental data for determining the crystallization rates from which the half-time (T/2) for crystallization is determined. The polymer sample is heated in a DSC cell (Perkin-Elmer), using a heating rate of 20° C./minute to 280° C. The polymer sample is kept in the molten state for 3 minutes at 280° C. and then cooled at a cooling rate of 50° C./minute to 240° C. The polymer sample is maintained under isothermal conditions at 240° C. for 15 minutes and the crystallization exotherm is determined. The time at which the crystals begin to grow uniformly has been termed as the onset of crystallization. The difference in time between the exotherm peak and the onset of crystallization is the half-time for crystallization.

Finish Level is measured by tetrachloroethylene stripping of the finish from yarn samples of a unit length according to industry standard test method MATM 2706.80 and determining the finish level by infrared absorbance at 2940 wavenumbers (3.4 micrometers). Finish sigma or finish coefficient of variation are determined using the number of samples indicated by "n=".

EXAMPLE 1

As indicated in Table 1, homopolymer nylon 6,6 flake and flake of a copolymer incorporating 5 mole % 2-methylpentamethylene adipamide (Me5–6) are made in an autoclave using procedures as described in U.S. Pat. No. 5,194,620. The RV of the polymer flake is approximately 47. $TiO_2$ is incorporated into the polymer at the level indicated. Controls were run for both polymers in which no nucleation additive compound was used. The invention is illustrated using calcium and magnesium adipate compared to controls with no nucleating agent. The calcium and magnesium adipate are added as salts to the aqueous solution of the polyamide monomers before polymerization is begun in the autoclave.

Using the polymer flake as made above, the invention is illustrated in a spin-draw process using a coupled spin-draw process for making a trilobal, fully-drawn 60 denier (66 dtex), 20 filament bright yarn. The polymer flake is extruded in twin-screw extruder and the RV of the polymer is increased to about 50 before spinning. The extruded filaments are quenched, converged and treated with a spin finish and the resulting yarn is withdrawn from quench zone at a speed of about 1600 mpm. Two cold draw stages are used to impart a total draw of about 1.9 X to the yarn followed by heat stabilization to prevent retraction on the package and to control shrinkage. The yarn is wound up at a speed of 3485 mpm.

The spin finish used is a dilute emulsion of a stearate-based finish containing both hydrophilic and hydrophobic emulsifiers having a surface tension of 30 dynes/cm$^2$ as measured on either a Wilhelmy plate or DuNuoy ring method.

Table 1 reports values for measured finish level, sigma of the finish, tenacity sigma, break elongation sigma, coefficient of variation of boil-off shrinkage, and one-end C. I. Acid Blue 122 fabric uniformity.

TABLE 1

| Item | 1 | 2 | 3 | 4 | 5 | 6 | 7 | 8 | 9 |
|---|---|---|---|---|---|---|---|---|---|
| Nyl. 6,6 mole % | 100 | 100 | 100 | 100 | 95 | 95 | 95 | 95 | 95 |
| Me 5–6 mole % | 0 | 0 | 0 | 0 | 5 | 5 | 5 | 5 | 5 |
| $TiO_2$ % | 0.27 | 0.27 | 0.02 | 0.02 | — | 0.02 | 0.02 | — | — |
| Additive | — | (A) | (A) | — | (A) | (A) | — | — | (B) |
| ppm Additive based on cation | — | 100 | 100 | — | 25 | 25 | — | — | 15 |
| Finish Level % n = 24 | .62 | .61 | .60 | .64 | .64 | .61 | .73 | .56 | .60 |
| Finish Sigma n = 24 | .028 | .020 | .017 | .024 | .016 | .02 | .067 | .100 | .006 |
| Tenacity Sigma dN/tex n = 16 | 0.14 | 0.11 | 0.12 | 0.06 | 0.04 | 0.13 | 0.10 | 0.11 | 0.07 |
| Elongation % Sigma n = 16 | 3.01 | 2.95 | 2.78 | 1.42 | 1.28 | 2.88 | 1.79 | 2.18 | 1.77 |
| Boil-Off Shrinkage % Coefficient of Variation n = 12 | 2.38 | 2.12 | 1.32 | 1.52 | 2.43 | 1.61 | 2.34 | 3.48 | 1.64 |
| C.I. Acid Blue 122 One-End Fabric Uniformity | 6.0 | 7.0 | 7.5 | 6.0 | 6.5 | 7.0 | 5.5 | 4.0 | 8.0 |

Additive Codes
(A) Calcium Adipate
(B) Magnesium Adipate
C.I. Acid Blue 122 One-End Fabric Uniformity Codes
4.0 Bad Streaks
5.0–5.5 Medium Streaks
6.0 Some Faint Streaks
6.5 Almost Good
7.0–7.5 Good
8.0 Very Good Item 2 (Invention) compared to Item 1 (Control) demonstrates the improved one-end C. I. Acid Blue 122 fabric uniformity provided by the addition of 100 ppm calcium adipate to homopolymer nylon 6,6 containing 0.27% $TiO_2$. Note the smaller finish sigma, tenacity sigma and coefficient of variation of boil-off shrinkage.

Item 3 (Invention) compared to Item 4 (Control) also demonstrates this same improved one-end C. I. Acid Blue 122 fabric uniformity because of the addition of 100 ppm calcium adipate in homopolymer nylon 6,6 with 0.02% $TiO_2$. Note the smaller finish sigma and coefficient of variation of boil-off shrinkage for invention Item 3 compared to the control Item 4.

Items 5–9 illustrate the benefits of the invention for 95/5 mole % nylon 66/Me5–6 copolymer with and without $TiO_2$ as a delusterant. Without delusterant, as little as 25 ppm calcium adipate as in Item 5 (Invention) can result in a low finish sigma and an improved one-end Acid Blue 122 fabric uniformity when compared to Item 8 (Control). Item 6 (Invention) compared to Item 7 (Control) demonstrates that the addition of calcium adipate while retaining the 0.02% delustrant from the filaments produced from 95/5 mole % nylon 66/Me5–6. Note the significant decrease in finish sigma, coefficient of variation for boil-off shrinkage, and better one-end C.I. Acid Blue 122 fabric dye uniformity.

Item 9 (Invention) illustrates the use of 15 ppm magnesium adipate. When compared to Item 8 (Control), this lowers the finish pickup sigma, tenacity sigma, coefficient of variation for boil-off shrinkage and raised the uniformity of the one-end Acid Blue 122 fabric. When Item 9 and Item 5 (calcium adipate) are compared, Item 9 containing magnesium adipate has the lowest finish sigma, low tenacity sigma, lowest elongation sigma, lowest coefficient of shrinkage variation, the best C.I. Acid Blue 122 one-end fabric uniformity and provides the most stable filament spinning process.

EXAMPLE 2

The procedures of Example 1 are repeated using 114 ppm calcium acetate in 95/5 mole % nylon 6,6/Me5–6 copolymer instead of a nucleating agent in accordance with the invention. During polymerization in the autoclave, a significant decrease in RV is observed, i.e., an RV of 40 for the polymer flake containing the calcium acetate obtained compared with an RV of about 50 for a control flake with no calcium acetate. When it is attempted to spin the polymer using the procedure of Example 1, the as-spun filaments are too soft and are difficult to control in the quench chimney and continuous spinning is not possible.

EXAMPLE 3

The procedures of Example 1 are used except that in this series 40 denier (44 dtex), 13 trilobal filament yarns are made. Table 2 lists the values for the polymer type, $TiO_2$ level used, measured finish coefficient of variation, tenacity, sigma of tenacity, elongation, sigma of elongation, 1% modulus, and coefficient of variation of boil-off shrinkage.

TABLE 2

| Item | 1 | 2 | 3 | 4 | 5 | 6 | 7 | 8 | 9 |
|---|---|---|---|---|---|---|---|---|---|
| Nyl. 6,6 mole % | 100 | 100 | 95 | 95 | 95 | 100 | 100 | 100 | 95 |
| Me 5–6 mole % | 0 | 0 | 5 | 5 | 5 | 0 | 0 | 0 | 5 |
| $TiO_2$ % | 0.27 | 0.27 | 0.27 | 0.27 | 0.27 | 0.27 | 0.02 | 0.02 | 0.02 |
| ppm Mg-Adipate based on Mg | — | 12 | 20 | 20 | 30 | 20 | — | 20 | 20 |
| Finish % | 0.81 | 0.70 | 0.68 | 0.58 | 0.56 | 0.61 | 0.81 | 0.75 | 0.73 |
| Coef. Var. | 12.6 | 3.8 | 4.7 | 7.0 | 4.1 | 5.4 | 15.4 | 6.0 | 4.1 |
| n = | 100 | 36 | 36 | 36 | 36 | 36 | 100 | 36 | 18 |
| Tenacity dN/tex | 3.87 | 4.02 | 4.06 | — | 3.97 | 4.06 | 3.81 | 3.91 | — |
| Coef. Var. | 3.15 | 2.53 | 2.37 | — | 2.05 | 2.36 | 3.17 | 2.15 | — |
| n = | 100 | 8 | 18 | — | 36 | — | 100 | 36 | — |
| Elongation % | 44.2 | 44.9 | 44.4 | — | — | — | 47.4 | 43.9 | — |
| Coef. Var. | 6.6 | 5.9 | 5.2 | — | — | — | 6.1 | 4.5 | — |
| n = | 100 | 8 | 18 | — | — | — | 100 | 36 | — |
| 1% Modulus dN/tex | 15.7 | 16.6 | 16.7 | — | — | — | 14.8 | 16.5 | — |
| Coef. Var. | 3.15 | 0.67 | 1.97 | — | — | — | 2.92 | 1.08 | — |
| n = | 100 | 8 | 18 | — | — | — | 100 | 36 | — |
| Shrinkage % (Boil-Off) | 5.5 | 5.67 | 6.31 | 6.27 | 6.33 | 5.64 | 5.54 | 5.67 | — |
| Coef. Var. | 4.95 | 3.8 | 3.25 | 3.21 | 3.15 | 2.51 | 3.83 | — | — |
| n = | 100 | 8 | 18 | 36 | 36 | 36 | 100 | 36 | — |

EXAMPLE 4

Differential Scanning Calorimetry (DSC) measurements are made on a series of polymer samples as indicated in Table 3. Items 1–6 are made in accordance with Example 1 above and contain varied quantities of $TiO_2$ as indicated. Control items 7–9 which contain magnesium hydroxide, magnesium oxide and calcium hydroxide are made by mixing the compounds as dry powders into the molten polymer.

The onset of crystallization and half time ($T_{1/2}$) are indicated in Table 3

Figure 2:
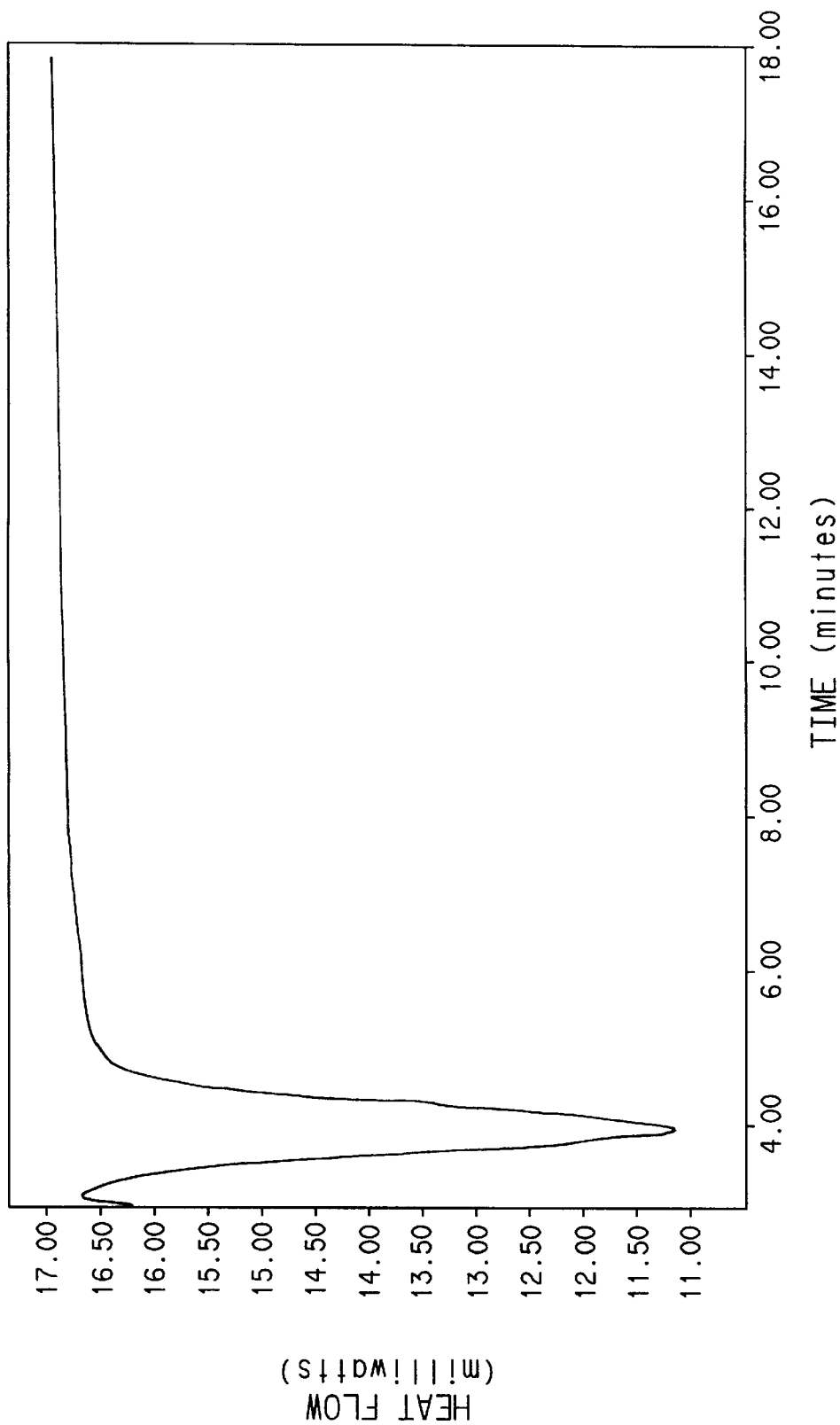
FIG. 2 is a graphical representation as in FIG. 1 for a nylon 6,6 composition containing calcium adipate in accordance with the invention as in Example 4, Item 3.
Figure 3:
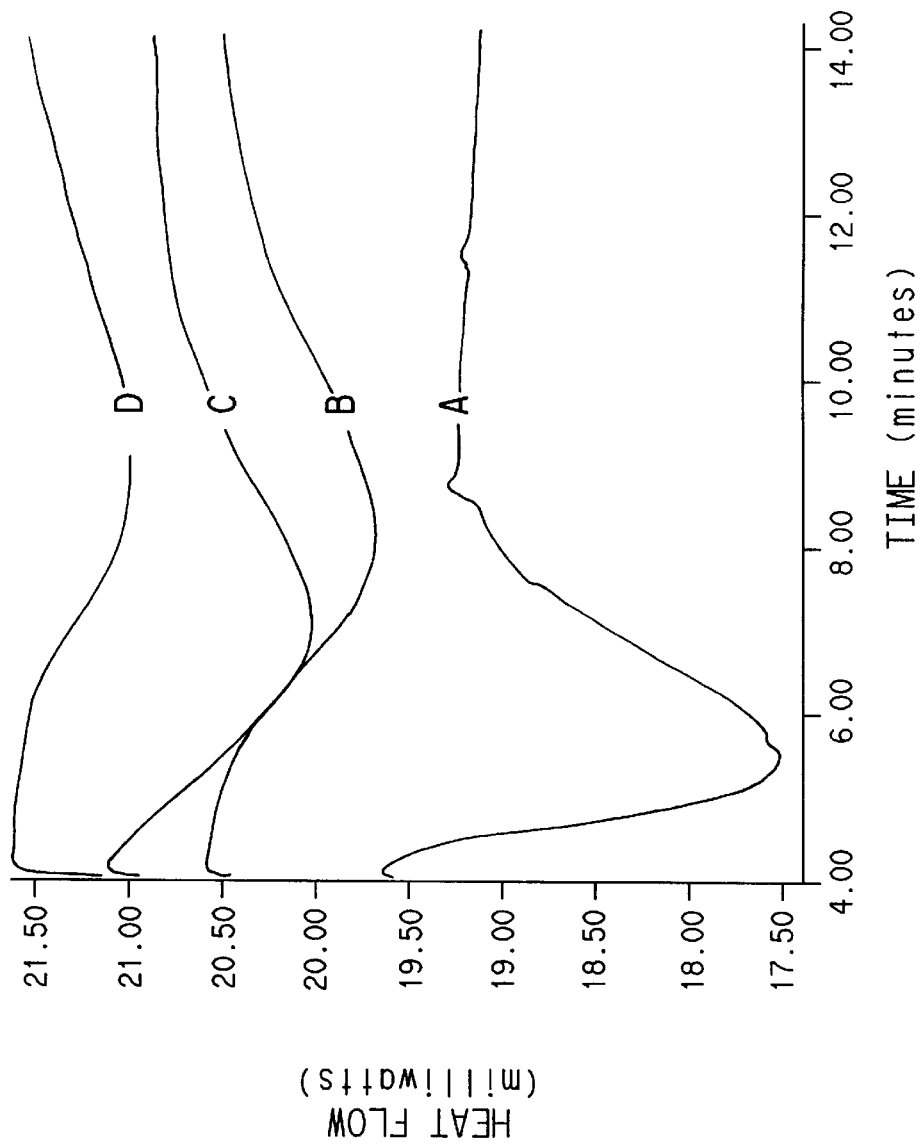
FIG. 3 is a graphical representation as in FIG. 1 in which curve C is a trace for a nylon copolymer composition [95 mole % poly(hexamethylene adipamide) and 5 mole % poly(2-methylpentamethylene adipamide)] containing calcium adipate in accordance with the invention as in Example 4, Item 5; curve D is for a similar composition containing no additive as in Example 4, Item 4; curve B is for a similar composition containing calcium hydroxide as in Example 4, Item 9; and curve A is a nylon 66 composition as in FIG. 1.

FIG. 1 is the DSC trace of heat flow plotted against time for Item 1 (Control). FIG. 2 is a similar DSC trace for Item 3 (Invention). In FIG. 3, curve C is a DSC trace for Item 5 (Invention), curve D is for Item 4 (Control), curve B is a trace for Item 9 (Control), and curve A is the same as FIG. 1 for Item 1 (Control).

provided by the invention is found to improve surface characteristics (functional and esthetic) of articles made of compositions in accordance with the invention versus a control. Molded test bars of these compositions are prepared and tensile (Instron) and shrinkage properties are measured. Table 4 below summarizes the measured properties.

TABLE 4

|  | Stress at max. load MPa | Max. Strain % | Strain at yield % | Shrinkage % |
|---|---|---|---|---|
| Control | 78 | 48 | 4.6 | 1.96 |
| Item 1 (31 ppm Zn adipate based on Zn) | 82 | 41 | 4.5 | 1.80 |
| Item 2 (14 ppm Mg adipate based on Mg) | 82 | 47 | 4.4 | 1.90 |

TABLE 3

| Item | 1 | 2 | 3 | 4 | 5 | 6 | 7 | 8 | 9 |
|---|---|---|---|---|---|---|---|---|---|
| Nyl 66 mole % | 100 | 100 | 100 | 95 | 95 | 95 | 100 | 100 | 95 |
| Me 5–6 mole % | 0 | 0 | 0 | 5 | 5 | 5 | 0 | 0 | 5 |
| $TiO_2$ % | — | 0.27 | 0.27 | 0.02 | — | — | — | — | — |
| Additive | — | — | (A) | — | (A) | (B) | (C) | (D) | (E) |
| ppm Additive based on cation | — | — | 100 | — | 25 | 15 | 100 | 100 | 100 |
| Onset of Crystallization (Minutes) | — | 3.41 | 3.40 | 5.84 | 5.51 | 4.18 | 4.08 | 4.15 | 5.31 |
| $T_{1/2}$ (Minutes) | 1.17 | 1.20 | 0.65 | 2.84 | 2.53 | 1.93 | 1.17 | 1.15 | 2.77 |

Additive Codes
(A) Calcium Adipate
(B) Magnesium Adipate
(C) Magnesium Hydroxide
(D) Magnesium Oxide
(E) Calcium Hydroxide

EXAMPLE 5

Zinc and magnesium adipate are added to nylon 6,6 molding compound compositions containing 0.2% lubricant, as summarized in Table 4 below. The increased crystallinity The stress at maximum load for Items 1 and 2 is significantly improved when compared to the control. Surprisingly, unlike the control, the test bars with zinc or magnesium adipate does not break at yield.

EXAMPLE 6

Differential Scanning Calorimetery (DSC) measurements are made on homopolymer nylon 6 and nylon 12 with and without magnesium adipate as indicated in Table 5. The nylon 6 and nylon 12 are virgin polymer with no additives and are used as obtained from Aldrich Chemical Company, Milwaukee, Wis. 53233. The nylon 6 sample shows a melting point of 224° C. at a DSC heating rate of 20° C. per minute. The nylon 12 sample shows a melting point of 180° C. at the same DSC measurement conditions. In each case, these melting points indicate suitability for use as molding resins or in the melt-spinning of fibers. The results are summarized in Table 5. below.

TABLE 5

|  | $T_{1/2}$ (minutes) |
|---|---|
| Nylon 6 | 2.9 |
| Nylon 6 + Mg Adipate, 200 ppm based on Mg | 2.1 |
| Nylon 12 | 2.7 |
| Nylon 12 + Mg Adipate 200 ppm based on Mg | 0.4 |

What is claimed is:

1. In a process for forming a shaped article from nylon polymer including melting the polymer and forming the molten polymer into an article, the improvement which comprises adding a water-soluble additive compound to said polymer before said forming, said water-soluble additive compound being selected from the group consisting of magnesium, calcium and zinc salts of aliphatic dicarboxylic acids having 2 to 14 carbon atoms and mixtures thereof and being added in sufficient quantity to provide at least about 5 ppm of said compound in said nylon polymer based on the weight of said magnesium, calcium and zinc when said nylon polymer comprises a homopolymer, and at least about 5 ppm to about 150 ppm of said compound in said nylon polymer based on the weight of said magnesium, calcium and zinc when said nylon polymer comprises a copolymer, and said nylon polymer being substantially free of fluoride.

2. The process of claim 1 wherein said polymer comprises polyadipamide polymer.

3. The process of claim 2 wherein said polymer comprises homopolymer poly(hexamethylene adipamide).

4. The process of claim 2 herein said nylon polymer is a copolymer comprising at least about 60 mole percent hexamethylene adipamide units.

5. The process of claim 4 wherein said copolymer comprises at least about 0.2 mole percent 2-methylpentamethylene adipamide units.

6. The process of claim 1 wherein said nylon polymer is made by polymerization of monomers from an aqueous solution and said additive is added to said aqueous solution.

7. The process of claim 1 wherein said process is a melt-spinning process for making nylon fiber and said water-soluble additive compound is added before melt-spinning of said fiber.

8. The process of claim 1 wherein said additive is selected from the class consisting of calcium, magnesium and zinc salts of adipic acid.

9. The process of claim 1 wherein about 5 to about 1000 ppm of said additive is added to said polymer based on the weight of the magnesium, calcium and zinc when said nylon polymer comprises a homopolymer.

10. The process of claim 1 wherein said polymer contains less than about 3 ppm fluoride.

11. The process of claim 1 wherein said polymer is substantially free of monocarboxylic acids and their salts.

* * * * *